United States Patent [19]
Heidel et al.

[11] Patent Number: 5,511,320
[45] Date of Patent: *Apr. 30, 1996

[54] ANGLE MEASUREMENT DEVICE EMPLOYING ANGLE SENSOR AND ELECTRONICS WITH LEAD CIRCUITRY INTEGRALLY FORMED ON A PRINTED CIRCUIT BOARD

[75] Inventors: Jeffrey C. Heidel; Bradley D. Carlson, both of Glendale; Warren W. Stansberry, Peoria, all of Ariz.

[73] Assignee: Cline Labs, Inc., Phoenix, Ariz.

[ * ] Notice: The term of this patent shall not extend beyond the expiration date of Pat. No. 5,381,604.

[21] Appl. No.: 247,301

[22] Filed: May 23, 1994

Related U.S. Application Data

[63] Continuation-in-part of Ser. No. 45,046, Apr. 8, 1993, abandoned.

[51] Int. Cl.⁶ .................................................. G01C 9/20
[52] U.S. Cl. .................................................. 33/366
[58] Field of Search ........................................ 33/366, 377

[56] References Cited

U.S. PATENT DOCUMENTS

| | | | |
|---|---|---|---|
| 4,644,662 | 2/1987 | Anderson et al. | 33/366 |
| 4,672,753 | 6/1987 | Kent et al. | 33/366 |
| 4,937,518 | 6/1990 | Donati et al. | 33/366 X |
| 5,014,795 | 5/1991 | Gibson | 33/366 X |
| 5,083,383 | 1/1992 | Heger | 33/366 |
| 5,180,986 | 1/1993 | Swartz et al. | 33/366 X |

FOREIGN PATENT DOCUMENTS

| | | | |
|---|---|---|---|
| 0216012 | 12/1984 | Japan | 33/366 |
| 0043714 | 2/1989 | Japan | 33/366 |

*Primary Examiner*—Alvin Wirthlin
*Attorney, Agent, or Firm*—William E. Hein

[57] ABSTRACT

An integral resistive angle measurement device employs a printed circuit board having electronic components mounted on the front surface thereof and having a pair of sensor plates etched into the back surface thereof and a metallic web mounted between the pair of sensor plates on the back surface of the printed circuit board. Containment of the resistive sensor fluid adjacent the sensor plates is accomplished by soldering a sensor cover to an etched sealing ring on the back of the circuit board. The sensor plates etched into the back of the printed circuit board, in combination with the sensor fluid, act as variable resistors whose resistance changes as a function of their angle of rotation from a reference position. An output signal across these variable resistors is in or out of phase with an applied reference signal. The output signal is demodulated with the same reference signal and then filtered to a DC level that corresponds to the angle of rotation. An output stage serves as a driver and also as a means for permitting the user to remotely control the electronic lead of the angle measurement device.

3 Claims, 2 Drawing Sheets

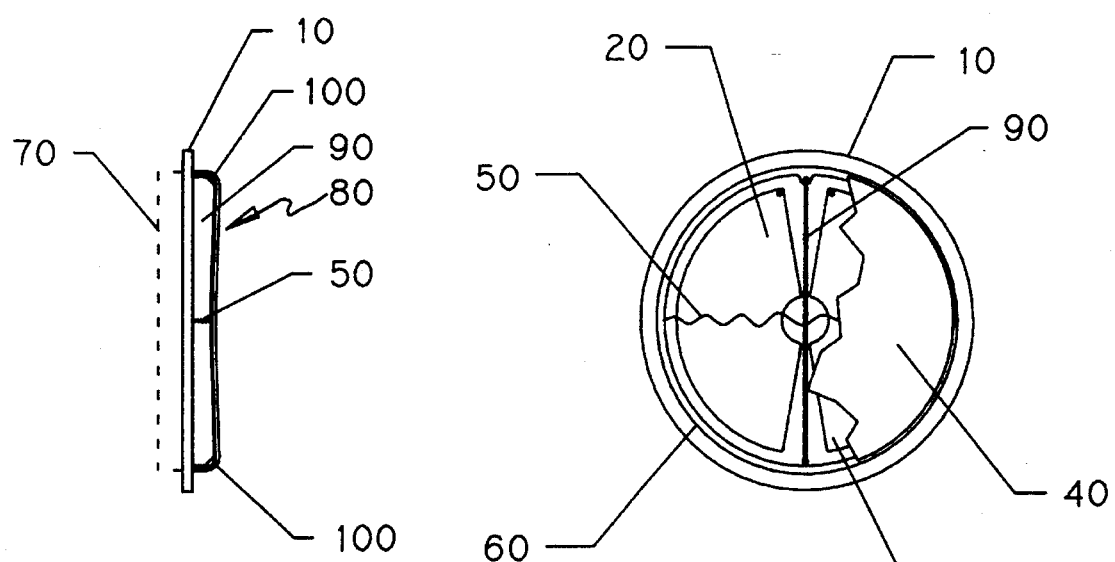
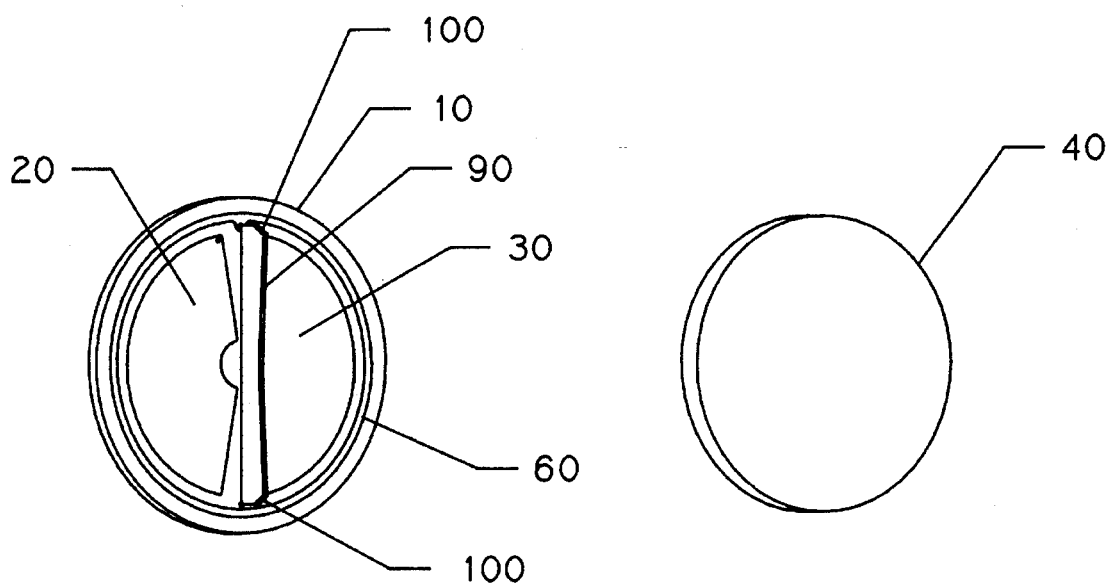
FIG 1A    FIG 1B
FIG 1C    FIG 1D

ANGLE MEASUREMENT DEVICE EMPLOYING ANGLE SENSOR AND ELECTRONICS WITH LEAD CIRCUITRY INTEGRALLY FORMED ON A PRINTED CIRCUIT BOARD

REFERENCE TO RELATED APPLICATION

This is a continuation-in-part application of application Ser. No. 08/045,046 filed on Apr. 8, 1993, now abandoned.

BACKGROUND AND SUMMARY OF THE INVENTION

This invention relates generally to angle measurement devices and more particularly to such devices in which the measurement is made with respect to gravity using a resistive sensor in conjuction with lead circuitry.

Several angle measurement devices are known in the prior art, of which U.S. Pat. Nos. 4,503,622, 4,707,927, 4,547, 972, 4,866,850, and 5,083,383 are exemplary. These prior art angle measurement devices typically employ an angle sensor that is physically separated from the electronics employed in the devices. The angle sensors are generally of the resistive type employing a potentiometer having an attached pendulum to reference gravity or of the resistive type employing a liquid-filled glass vial. The resistive type prior art sensors suffer inaccuracies due to friction in the pivot joint, while the resistive type sensors employing glass vials are expensive to produce. The physical separation of either type of sensor from its associated electronics is disadvantageous, particularly in the case of capacitive sensors in which the length of leads connecting the electronics to a remotely located sensor or the movement of those leads affects the capacitance of the sensor.

U.S. Pat. No. 4,644,662 is directed to a capacitive type angle sensor that employs a teflon coating on the sensor plates to insulate them from the fluid contained within the sensor and to serve as part of the sealing mechanism. These sensors are also taught to be remotely mounted. The coating on the sensor plates, in conjunction with rings machined into the sensor housing, serves to seal the fluid inside the sensor. However, this sealing arrangement is prone to leakage if the housing screws are not precisely torqued. In addition, the maximum temperature at which these prior art sensors can operate is limited because at higher temperatures the vapor pressure inside the fluid vessel increases to a point beyond which the sealing rings are not effective, thereby permitting the undesirable loss of fluid. Also, the types of sensors that incorporate a fluid as the sensing medium are generally desigend for static applications because, as the sensor is rotated, acceleration forces acting upon the fluid will cause the fluid to slosh, resulting in inaccurate indications. The rate at which the fluid will slosh is determined by the rate of accleration to which the user subjects the sensor.

It is therefore a principal object of the present invention to provide an improved angle measurement device in which the angle sensor and associated electronics are an integral unit, thereby eliminating the problems associated with prior art angle measurement devices in which those components are physically separated.

It is a further object of the present invention to provide an improved angle measurement device in which the containment of the sensor fluid is accomplished in a way that permits operation at higher temperatures than was previously possible.

It is yet another object of the present invention to provide an improved angle measurement device in which the user may remotely control the operation of an internal lead circuit that serves to compensate for acceleration to which the sensor is subjected.

It is yet another object of the present invention to provide an improved angle measurement device that incorporates a partial barrier inside a fluid vessel to dampen the fluid movement as the sensor is rotated, thereby reducing the sensor's sensitivity to motion transients.

These and other objects are accomplished in accordance with the illustrated preferred embodiment of the present invention by providing a printed circuit board having electronic components mounted on the front surface thereof and having a pair of sensor plates etched into the back surface thereof. Containment of the sensor fluid adjacent the sensor plates and a partial web is accomplished by soldering a sensor cover to an etched sealing ring on the back of the circuit board. The sensor plates etched into the back of the printed circuit board, in combination with the sensor fluid, act as variable resistors whose resistance changes as a function of their angle of rotation from a reference position. An output signal across these variable resistors is in or out of phase with an applied reference signal. The output signal is demodulated with the same reference signal and then filtered to a DC level that corresponds to the angle of rotation. An output stage serves as a driver and electronic lead circuit and also as a means for permitting the user to remotely control the application of the electronic lead circuit in the angle measurement device.

BRIEF DESCRIPTION OF THE DRAWINGS

FIG. 1A is a side view pictorial diagram of a resistive type angle sensor formed on the back surface of an electronics printed circuit board, in accordance with the present invention.

FIG. 1B is a cutaway front view pictorial diagram of the angle sensor of FIG. 1A, illustrating the relationship between a pair of sensor plates, a web, sensor fluid, a sealing ring, and a cap.

FIG. 1C is a front view pictorial diagram of the angle sensor of FIGS. 1A and 1B, illustrating the sensor plates, web, and sealing ring in the absence of the sensor fluid and the cap.

FIG. 1D is a front pictorial diagram of the cap that covers the angle sensor of FIGS. 1A–C.

DETAILED DESCRIPTION OF THE INVENTION

Figure 2:
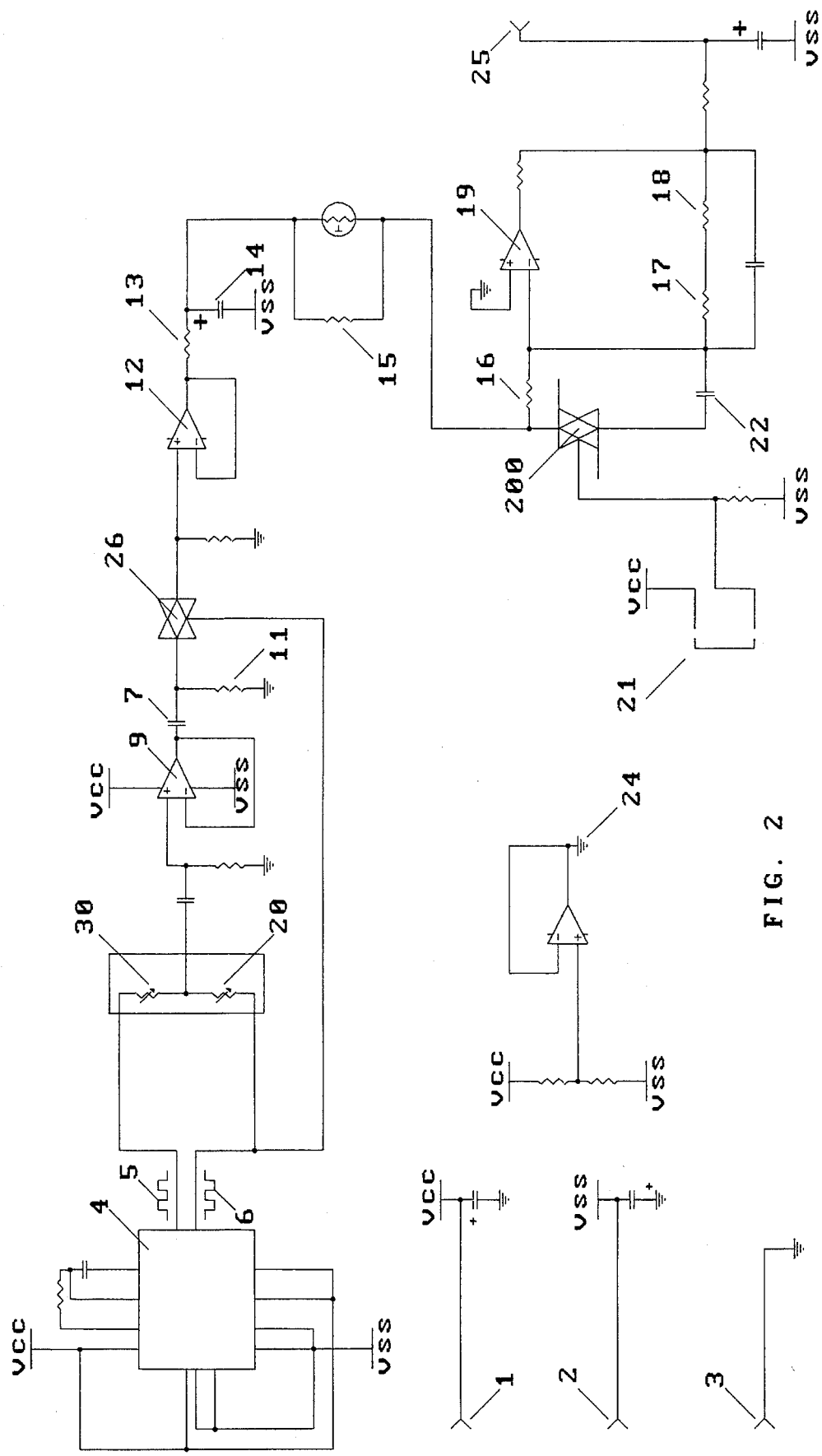
FIG. 2 is a detailed schematic diagram of electronic circuitry that is mounted on the front surface of the printed circuit board of FIGS. 1A–D to form, in combination with the angle sensor of FIGS. 1A–D, an angle measurement device in accordance with the present invention.

Referring now to FIGS. 1A–D, there is shown a conventional copper clad printed circuit board 10 having electronic circuit components 70 mounted on a front surface thereof and having an encased angle sensor 80 formed on a back surface thereof. Together, electronic circuit components 70 and angle sensor 80 comprise the angle measurement device of the present invention. Angle sensor 80 comprises a pair of sensor plates 20, 30 that are etched from a copper clad surface layer of printed circuit board 10. Also, a clad copper barrier or web 90 is placed on the sensor side of the printed circuit board 10. A small opening 100 in web 90 is provided to allow sensor fluid to pass slowly from one side of the web 90 to the other. A copper cap 40 is soldered to a sealing ring 60 that is al so etched from the copper clad surface layer of printed circuit board 10. The copper cap 40 serves to enclose the sensor plates 20, 30 in the presence of a conventional resistive sensor fluid 50 that occupies approximately one-half of the volume enclosed by copper cap 40.

Referring now to FIG. 2, there is shown a detailed schematic diagram of the circuitry comprising circuit components 70, illustrated in FIG. 1A as being mounted on the front surface of printed circuit board 10. The circuitry of FIG. 2 comprises dual function circuitry that is powered by a positive DC supply voltage in the range of 8–24 volts applied at terminals 1 and 2. A multivibrator 4 generates in-phase and out-of-phase signals 5, 6 that are impressed on the right and left sensor plates 30, 20, respectively, of FIGS. 1B and 1C. As the angle sensor 80 of FIGS. 1A–D is rotated about its axis, more of the right or left sensor plates 30, 20 will be covered by the resistive sensor fluid 50 and, consequently, more or less of the signals 5, 6 will be coupled to a driver amplifier 9. A capacitor 7 and resistor 11 serve to reference the output of driver amplifier 9 to 1/2 the supply voltage. A conventional analog switch 26 is employed to demodulate the signal received from driver amplifier 9, using the out-of-phase signal 6. The resultant demodulated signal is applied to a driver amplifier 12, the output of which is filtered by means of a resistor 13 and capacitor 14 to a DC level corresponding to the angular rotation of angle sensor 80, with the amplitude of the DC level corresponding to the phase rotation of angle sensor 80. Resistors 15, 16, 17, 18 determine the gain of an output stage amplifier 19. A switch 200 is provided to place resistor 16 in parallel with capacitor 22, thereby enabling the user to switch between a predetermined electronic lead setting by means of a jumper 21.

Point 24 serves to apply one-half the supply voltage on the ground terminal. In this ratiometric mode, the circuitry of FIG. 2 will perform such that the output will be referenced to one-half the supply voltage. If the supply voltage is 10 volts and the angular rotation of angle sensor 80 is zero degrees or null, the output voltage at terminal 25, with reference to terminal 2, will be 5 volts. As the angle sensor 80 is rotated clockwise, the output voltage at terminal 25 will increase toward 10 volts, and as the angle sensor 80 is rotated counter clockwise, the output voltage at terminal 25 will decrease from 5 volts toward zero.

We claim:

1. An integral resistive angle measurement device consisting essentially of the following elements:

a single printed circuit board having front and back surfaces;

a pair of sensor plates formed on the back surface of said single printed circuit board;

a single cylindrically-shaped cap sealed to said back surface of said single printed circuit board so as to cover said pair of sensor plates, said cap retaining a volume of resistive sensor fluid in contact with a portion of each one of said pair of sensor plates;

a metallic sealing ring surrounding said pair of sensor plates, said metallic sealing ring being electrically insulated from said pair of sensor plates, said single cylindrically-shaped cap being sealed to said metallic sealing ring by soldering;

a flat metallic web mounted on said back surface of said printed circuit board between said pair of sensor plates, said flat metallic web being positioned perpendicular to said single printed circuit board, and said flat metallic web including at 1 east one opening therein for permitting communication of said resisitive fluid across said flat metallic web; and electronic circuitry mounted only on said front surface of said single printed circuit board, said electronic circuitry being responsive to incremental angular rotation of said angle measurement device for providing an output signal representative of an angle of rotation of said angle measurement device.

2. An integral angle measurement device as in claim 1 wherein said electronic circuitry includes switching means for enabling the user to select a predetermined amount of electronic lead to thereby compensate for acceleration forces to which the device may be subjected.

3. An integral resistive angle measurment device as in claim 1 wherein each one of said pair of sensor plates is formed by etching a metallic clad layer on said back surface of said printed circuit board.

\* \* \* \* \*